(12) United States Patent
Yang

(10) Patent No.: US 8,315,003 B1
(45) Date of Patent: Nov. 20, 2012

(54) BIT PATTERNED MAGNETIC MEDIA DATA FORMAT

(75) Inventor: Xueshi Yang, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/277,397

(22) Filed: Oct. 20, 2011

Related U.S. Application Data

(62) Division of application No. 12/266,351, filed on Nov. 6, 2008, now Pat. No. 8,045,284.

(60) Provisional application No. 60/987,907, filed on Nov. 14, 2007.

(51) Int. Cl.
*G11B 5/09* (2006.01)
(52) U.S. Cl. ............................................. 360/48; 360/51
(58) Field of Classification Search ........................ None
See application file for complete search history.

(56) References Cited

U.S. PATENT DOCUMENTS

| | | | |
|---|---|---|---|
| 5,844,920 A | 12/1998 | Zook et al. | |
| 7,203,015 B2 | 4/2007 | Sakai et al. | |
| 7,787,205 B2 | 8/2010 | Kuznetsov et al. | |
| 8,045,284 B2 | 10/2011 | Yang | |
| 8,045,285 B1 | 10/2011 | Yang et al. | |
| 2003/0072971 A1 | 4/2003 | Fukutani et al. | |
| 2008/0080082 A1 | 4/2008 | Erden et al. | |
| 2008/0106816 A1 | 5/2008 | Silvus | |
| 2009/0003144 A1 | 1/2009 | Mallary et al. | |
| 2009/0091854 A1 | 4/2009 | Tang | |
| 2009/0122441 A1 | 5/2009 | Yang | |

FOREIGN PATENT DOCUMENTS

WO  WO-2009064660  5/2009

OTHER PUBLICATIONS

"PCT International Search Report", Application Serial No. PCT/US08/82686, (Feb. 17, 2009), 3 pages.
Terris, B D., et al., "Patterned Media for Future Magnetic Data Storage", *Microsystem Technologies*, vol. 13, No. 2,(Apr. 5, 2006), pp. 189-196.
"Preliminary Report on Patentability and Written Opinion", Application No. PCT/US2008/082686, (May 27, 2010), 9 pages.
"Restriction Requirement", U.S. Appl. No. 12/266,351 (Jul. 19, 2010), 6 pages.
"Non-Final Office Action", U.S. Appl. No. 12/266,351, (Aug. 16, 2010), 9 pages.
"Non-Final Office Action", U.S. Appl. No. 12/389,118, (Nov. 5, 2010), 11 pages.
"Final Office Action", U.S. Appl. No. 12/266,351, (Dec. 8, 2010), 9 pages.
"Non-Final Office Action", U.S. Appl. No. 12/266,351, (Feb. 24, 2011), 10 pages.
"Final Office Action", U.S. Appl. No. 12/389,118, (Mar. 30, 2011), 9 pages.
"Advisory Action", U.S. Appl. No. 12/389,118, (Jun. 21, 2011), 3 pages.
"Notice of Allowance", U.S. Appl. No. 12/266,351, (Jul. 21, 2011), 6 pages.
"Notice of Allowance", U.S. Appl. No. 12/389,118, (Jul. 21, 2011), 4 pages.
"Non-Final Office Action", U.S. Appl. No. 13/277,474, Jan. 30, 2012, 5 pages.
"Notice of Allowance", U.S. Appl. No. 13/277,474, (May 11, 2012), 6 pages.

*Primary Examiner* — Regina N Holder

(57) ABSTRACT

In an implementation, a media drive comprises bit patterned magnetic media and one or more modules. The one or more modules are to cause data to be written on the bit patterned magnetic media in a data sector that includes a synchronization mark disposed between data blocks of the data sector.

20 Claims, 9 Drawing Sheets

BIT PATTERNED MAGNETIC MEDIA DATA FORMAT

RELATED APPLICATION

This present disclosure is a divisional of U.S. application Ser. No. 12/266,351, filed on Nov. 6, 2008, which claims priority under 35 U.S.C. §119(e) to U.S. Provisional Application Ser. No. 60/987,907, filed on Nov. 14, 2007, the entire disclosure of which is hereby incorporated by reference in its entirety.

BACKGROUND

In a conventional magnetic media drive, a continuous film of magnetic material is typically used to store bits of data. Each bit is traditionally defined on the magnetic material through the action of a write head of the media drive. Thus, the locations of the bits of the media drive were traditionally defined by the action of the write head itself and not by the magnetic media on which the bits were written.

In order to increase the amount of bits that may be stored on traditional magnetic media, techniques were developed to decrease the amount of space consumed by each of the bits on the magnetic media. Thus, the amount of bits that could be stored on a given area of the traditional magnetic media increased as the amount of space consumed by each of the bits decreased. However, reliability of the bits to persist data may also decrease as the amount of space consumed by each of the bits decreases. For example, heat may cause bits to change a magnetic orientation when the amount of magnetic material used to store each of the bits becomes sufficiently small. Consequently, storage of data using these bits may become unreliable.

Accordingly, bit patterned magnetic media has been developed. Bit patterned magnetic media may physically isolate magnetic material that is used to store the bits as separate islands. This isolation helps retain magnetic orientation of the bits and therefore increases the reliability of data storage. However, conventional techniques that are used to write to and read from bit patterned magnetic media may cause data errors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an implementation, a media drive comprises bit patterned magnetic media and one or more modules. The one or more modules are to cause data to be written on the bit patterned magnetic media in a data sector that includes a synchronization mark disposed between data blocks of the data sector.

In an implementation, a media drive comprises bit patterned magnetic media and one or more modules. The bit patterned magnetic media is configured to maintain a data sector that includes a synchronization mark disposed between data blocks of the data sector. The one or more modules are to read data from the data blocks of the data sector.

In an implementation, a data sector is written on bit patterned magnetic media by causing a first data block to be written to the bit patterned magnetic media for the data sector. A synchronization mark is inserted after the first data block and a second data block is caused to be written to the bit patterned magnetic media after the synchronization mark for the data sector.

In an implementation, a data sector is read from bit patterned magnetic media by reading a data block disposed between two synchronization marks included in the data sector. When a number of bits in the data block is different from a number of bits that are expected to be included in the data block, the number of bits is modified to form a frame having the number of bits that are expected. The frame is output.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
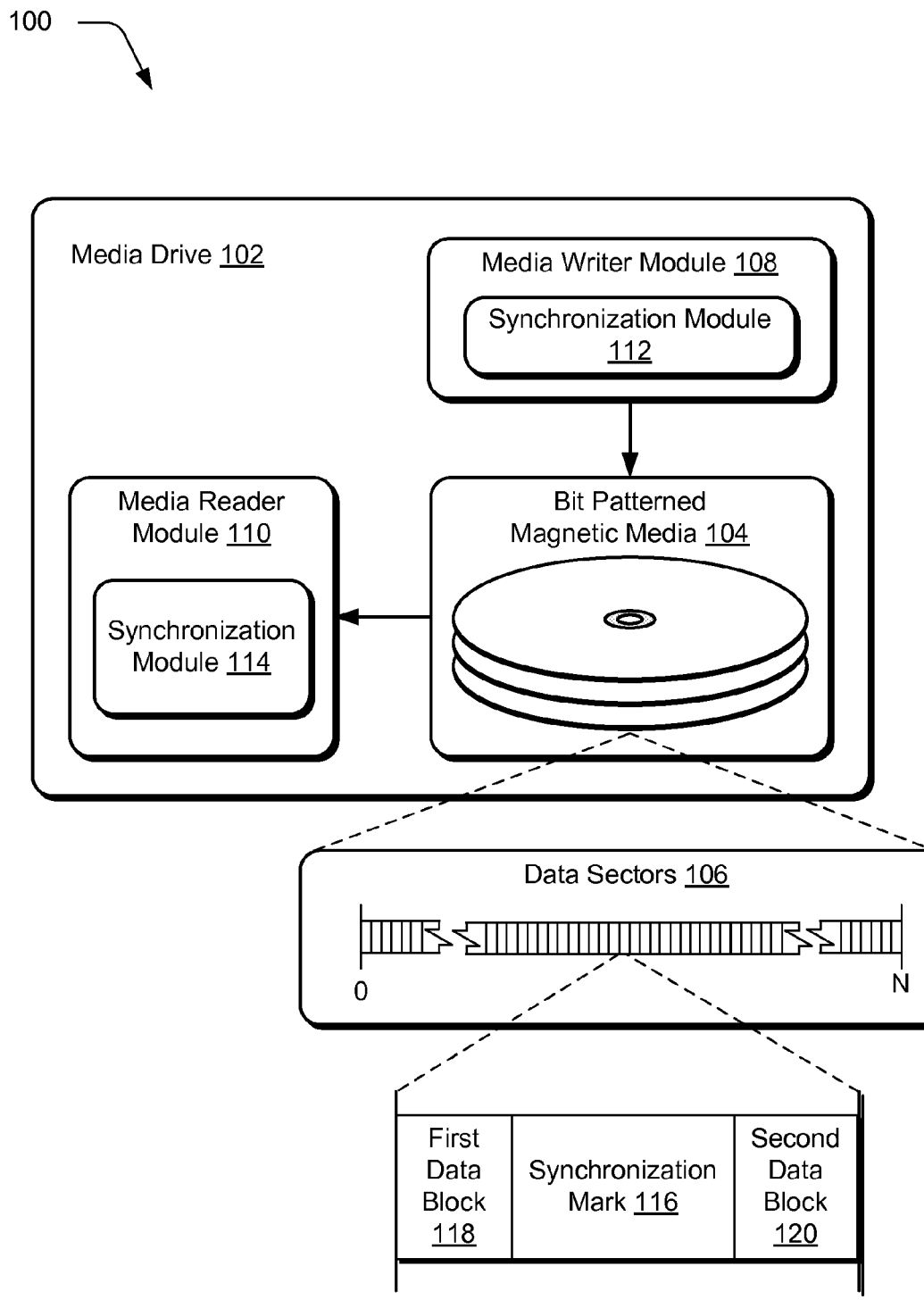
FIG. 1 is an illustration of an example operating environment that is configured to employ bit patterned magnetic media data format techniques.

Techniques to increase the amount of data storage on magnetic media traditionally involved decreasing an amount of space used to store each bit on the magnetic media (or increasing data density on the magnetic media). However, as a size of each of the bits (the amount of space of the magnetic media consumed) decreased so too did the ability of the magnetic media to persist data using those bits. For example, the size of the bits may decrease to a point at which heat may cause a change in magnetic orientation of the bits, such as to cause a bit to be changed from a one to a zero and vice versa.

Bit patterned magnetic media was developed to address these issues such that an amount of data that may be stored in a given area on magnetic media may continue to increase. Bit patterned magnetic media is configured such that the magnetic material used to store each of the bits is isolated, e.g., formed in islands. This isolation helps the magnetic material retain an orientation, thereby increasing reliability of the bit-patterned magnetic media to store data.

However, traditional techniques that were developed to write or read data from bit patterned magnetic media may corrupt the data. In some instance, a write head used to write data (e.g., a series of bits) to bit patterned magnetic media may lose synchronization with the bit patterned magnetic media. This loss of synchronization may then cause data errors as bits of data are added or omitted. For instance, a write head of a media drive may write bits at a slower rate than a rate at which the islands of the bit patterned magnetic media are encountered, thereby causing additional bits to be written to the bit patterned magnetic media. Similarly, the write head may write bits at a faster rate than a rate at which the islands are encountered, thereby causing bit omission. Therefore, a loss of synchronization between the write head and the islands in the bit patterned magnetic media may cause data corruption.

Bit patterned magnetic media data format is described. In an implementation, a synchronization mark is included within data in a data sector. In this way, an error that occurs before the synchronization mark in the data sector does not affect data after the synchronization mark in the data sector. For example, a data sector may include a preamble followed by an initial synchronization mark. Data following the initial synchronization mark may be formed in blocks delineated by one or more additional synchronization marks. Therefore, an error that occurs in a data block delineated by the synchronization marks does not affect another data block. A variety of different techniques may be used to read and/or write data using the bit patterned magnetic media data format described herein, examples of which may be found in the following discussion.

In the discussion that follows, example operating environments are first described that may incorporate the bit patterned magnetic media data format techniques. Example procedures are also described that may be employed in the example operating environments, as well as other environments. In instances in the discussion of the procedures, reference will be made to the environments by way of example. However, implementation of the procedures is not limited to the environments described herein. Likewise, the environments and the devices contained therein are not limited to performance of the procedures.

Example Environment

FIG. 1 illustrates an example operating environment 100 that is configured to employ one or more techniques relating to a bit patterned magnetic media data format. The illustrated operating environment 100 includes a media drive 102 having bit patterned magnetic media 104. The bit patterned magnetic media 104 is computer-readable to store data as a series of bits arranged across islands of magnetic material in a plurality of data sectors 106. In the following discussion, the data sectors 106 may be representative of one or more data sectors and therefore by convention may be referenced as a data sector 106, data sectors 106, a plurality of data sectors 106, and so on.

The bit patterned magnetic media 104 may be formed in a variety of ways. For example, magnetic material used to store bits may be arranged as a series of islands that are physically separated from each other. Therefore, the bit patterned magnetic media 104 predefines where bits are to be stored on the media through use of the islands, as opposed to a write head as was traditionally utilized by continuous magnetic media devices. In other words, the islands of magnetic material that form the bit patterning may define where bits are storable by the bit patterned magnetic media. In an implementation, the bits are lithographically defined using magnetic material to form the bit patterned magnetic media 104.

The media drive 102 is further illustrated as including a media writer module 108 and a media reader module 110. The media writer module 108 is representative of functionality of the media drive 102 to write data to the bit patterned magnetic media 104. Similarly, the media reader module 110 is representative of functionality of the media drive 102 to read data from the bit patterned magnetic media 104. Although the media writer module 108 and the media reader module 110 are illustrated separately for purposes of discussion, these modules may share components of the media drive 102, such as a hard disk head and arm configured to read from and write to the bit patterned magnetic media 104.

As previously described, errors may occur when a write head is not synchronized with a pattern of magnetic material that is used to store bits on the bit patterned magnetic media 104. In particular, bit insertions and omissions may occur when a write head progresses at a rate that is slower or faster than a rate at which individual islands of magnetic material that are used to store bits are encountered. Conventional error correction codes employed by traditional media drives are not well suited to correct bit insertions and omissions. On the other hand, error correction codes that are designed for bit insertion and/or omission may have a relatively low rate of performance.

The media writer module 108 and the media reader module 110 are illustrated as including respective synchronization modules 112, 114. The synchronization modules 112, 114 are representative of functionality of the respective media writer and media reader modules 108, 110 to employ a data format for the data sectors 106.

The data format specifies inclusion of a synchronization mark 116 within data in a data sector 106, such as between the first and second data blocks 118, 120 illustrated for data sector 106 in FIG. 1. Thus, an error that occurs on one side of the synchronization mark 116 is confined to that side of the synchronization mark 116 and does not spread to another side of the synchronization mark 116. For example, a write error that occurs in the first data block 118 does not corrupt the second data block 120. Thus, in this example the synchronization mark 116 is included within a data payload of the data sector, further discussion of which may be found in relation to the following figure.

Figure 2:
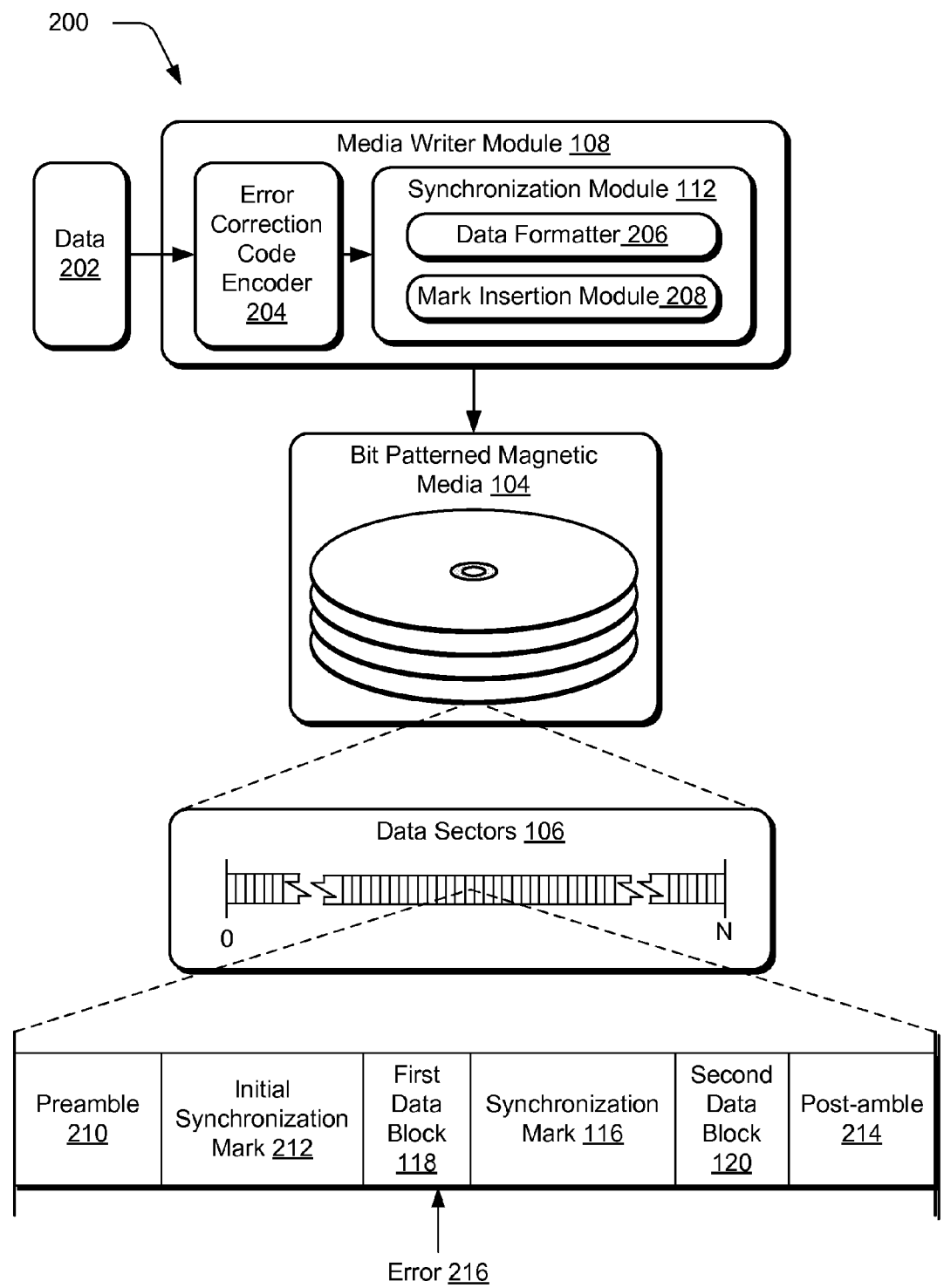
FIG. 2 is an illustration of an example operating environment showing a media writer module of FIG. 1 in greater detail.

FIG. 2 illustrates an example operating environment 200 showing the media writer module 108 of FIG. 1 in greater detail. In the operating environment 200 of FIG. 2, data 202 is illustrated as being received at the media writer module 108. The data 202 may originate from a wide variety of sources, such as an application executing on a computer that employed the media writer module 108, from a wireless interface, within the media drive 102 itself (such as for re-encryption of data stored on the bit patterned magnetic media 104), and so on.

The media writer module 108 includes an error correction code encoder 204 that is representative of functionality of the media writer module 108 to encode the data 202 in accordance with one or more error correction techniques. For example, the error correction code encoder 204 may add check bits to the data 202. The check bits may be used to help recover the data 202 in an event that an error occurs when reading or writing the data 202 to the bit patterned magnetic memory 104. A variety of other error correction code techniques are also contemplated.

The synchronization module 112 is illustrated as including a data formatter 206 and a mark insertion module 208. The data formatter 206 is representative of one or more modules that are configured to format data received from the error correction code encoder 204 for writing to the bit patterned magnetic media 104.

For example, the data formatter 206 may construct information that is used to form the data sectors 106. The information may include a preamble 210. The preamble 210 identifies a given data sector 106 from other data sectors 106 included on the bit patterned magnetic media 104 such that data sector 106 and consequently data in the data sector 106 may be located.

The information may also include an initial synchronization mark 212 that is used to identify where data is located in the data sector. The initial synchronization mark 212 indicates from what part of the data sector 106 the data is available. The information constructed by the data formatter 206 may also include a post-amble 214 that identifies an end of the data sector 106. The data formatter 206 may form each of the data sectors 106 to include a matching amount of data, although other non-matching implementations are also contemplated. Other information may also be provided by the data formatter 206 to form the data sector 106.

The mark insertion module 208 is representative of functionality of the media writer module 108 to insert one or more synchronization marks, an example of which is illustrated by synchronization mark 116. The synchronization mark 116 is illustrated as within a payload of the data sector 106 that includes the first data block 118 and the second data block 120. Therefore, if an error 216 were to occur in the first data block 118, the error 216 would not affect the second data block 120 and vice versa, further discussion of which may be found in relation to FIG. 3.

Although a single synchronization mark 116 is illustrated as within the payload of the data sector 106, additional data sectors 106 may be included at regular intervals. Additionally, the synchronization marks inserted by the mark insertion module 208 may bound the data in the payload of the data sector 106. For instance, synchronization marks 116 may be configured to define an expected size of data blocks in the data sector 106 by being disposed on both sides of the data blocks. In this way, the synchronization marks 116 may be used to indicate whether a bit insertion or omission occurred when writing and/or reading the data 202 to the data sectors 106, further discussion of which may be found in relation to FIG. 5.

In an implementation, the synchronization mark 116 may have a length that is less that the initial synchronization mark 212 to conserve storage space available on the bit patterned magnetic media 104. In other words, the synchronization mark 116 may be formed from less bits than the initial synchronization mark 212. A variety of other examples are also contemplated.

Figure 3:
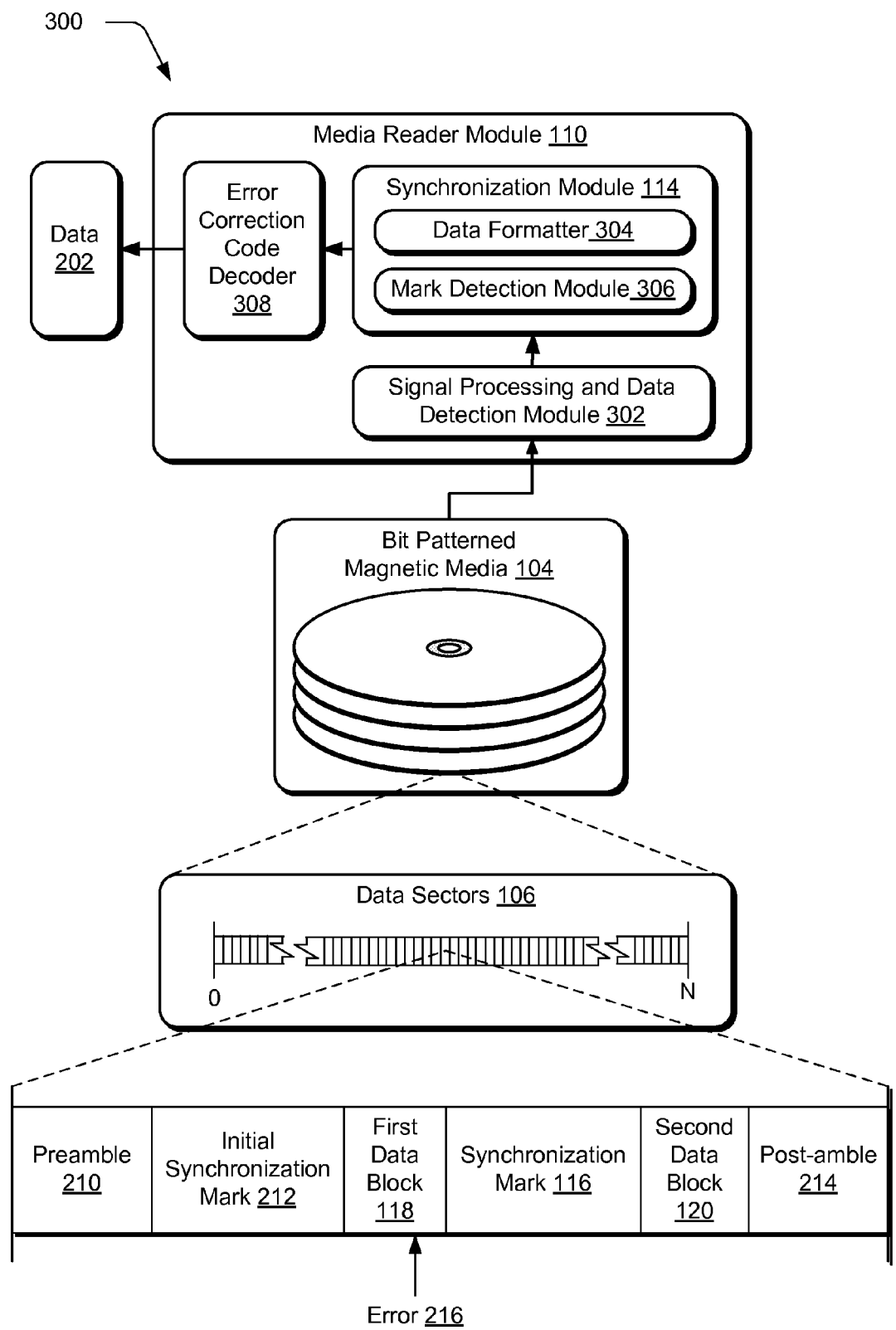
FIG. 3 is an illustration of an example operating environment showing a media reader module of FIG. 1 in greater detail as reading data from bit patterned magnetic media that was written by the media writer module of FIG. 2.

FIG. 3 is an illustration of an example operating environment showing the media reader module 110 of FIG. 1 in greater detail as reading data from the bit patterned magnetic media 104 that was written by the media writer module 108 of FIG. 2. The media reader module 110 is illustrated as including a signal processing and data detection module 302, a synchronization module 114 having a data formatter 304, a mark detection module 306, and an error correction code decoder 308.

The signal processing and data detection module 302 is representative of functionality of the media reader module 110 or read bits from islands of the bit patterned magnetic media 104. For example, the signal processing and data detection module 302 may determine a magnetic orientation of each island of magnetic material of the bit patterned magnetic media 104 and compute a corresponding one or zero for a bit stored on the island.

The data formatter 304 is representative of one or more modules that are configured to read a data format employed by the data sectors 106, such as the preamble 210, initial synchronization mark 212, post-amble 214, and so on.

The mark detection module 206 is representative of functionality of the media reader module 110 to read the synchronization mark 116 inserted by the mark insertion module 208 of the media writer module 108 of FIG. 2. As previously described, the synchronization mark 116 may be used for a variety of purposes, such as to isolate an error 216 that may occur in the first data block 118 from affecting the second data block 120. A variety of other examples are also contemplated, further discussion of which may be found in relation to FIGS. 4-5.

The error correction code decoder 308 is representative of functionality of the media reader module 110 to employ one or more error correcting techniques. For example, the error correction code decoder 308 may recover the data 202 in an event that an error occurs using one or more check bits inserted by the error correction code encoder 204 of FIG. 2. A variety of other error correction code techniques may also be employed by the error correction code decoder 308 and the error correction code encoder 204 of FIG. 2, such as error correction codes designed for bit-insertion and omission and conventional error correction codes such as Reed-Solomon.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, such as memory, bit patterned magnetic media, and so on. The features of the bit patterned magnetic media data format techniques described below are platform-independent, meaning that the techniques may be implemented on a variety of commercial computing platforms having a variety of processors.

Example Procedures

Figure 4:
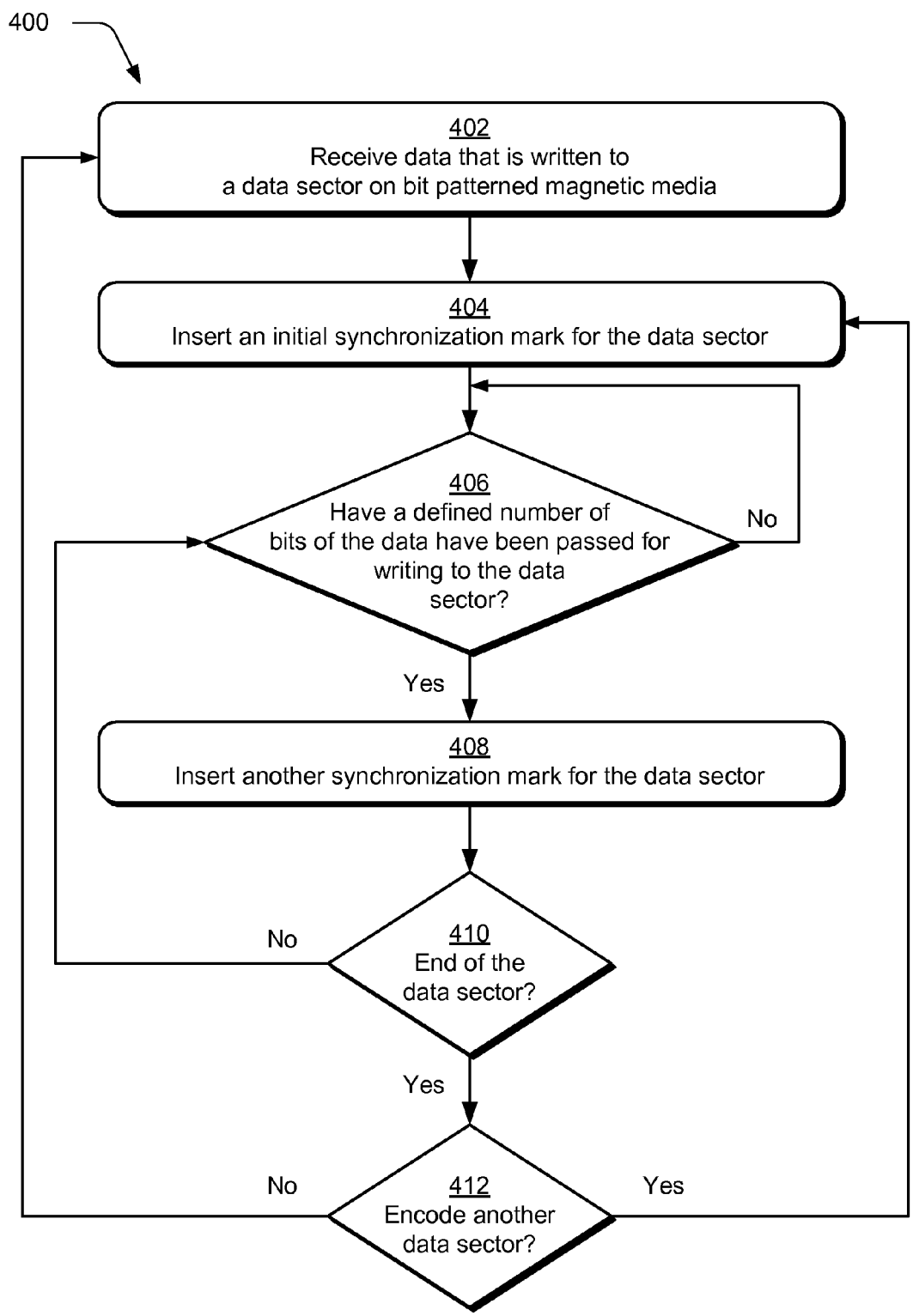
FIG. 4 is a flow diagram that depicts a procedure in an example implementation in which a data sector having a synchronization mark disposed between data blocks is written.

FIG. 4 depicts a procedure 400 in an example implementation in which data is written by a media drive (e.g., media drive 102) according to a bit patterned magnetic media data format. The following discussion may be implemented utilizing the previously described systems and devices, as well as other systems and devices subsequently described. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Data is received that is to be written to a data sector 106 on bit patterned magnetic media 104 (block 402). For example, the data 202 may be received from an application executed on a host (e.g., a personal computer), received via a wireless network, and so on.

An initial synchronization mark 212 is inserted for the data sector 106 (block 404). For example, the data formatter 206 may operate in conjunction with the mark insertion module 208 to cause the initial synchronization mark 212 to be inserted for the data sector 106. The initial synchronization mark 212 is to indicate where the data is located within the data sector 106.

A determination is then made as to whether a defined number of bits of the data have been passed for writing to the data sector 106 (decision block 406). For example, the synchronization module 112 may define an amount of bits to be included in each of the data blocks in the data sector 106. When the defined number has not passed (no from decision block 406), monitoring continues (repeat decision block 406). When the defined number has passed (yes from decision block 406), another synchronization mark 116 is inserted for the data sector (block 408). For example, the defined number of bits may define a size of the first data block 118. This portion of the procedure 400 repeats (no from decision block 410 to decision block 406) until the end of the data sector has been reached (yes from decision block 410). Thus, in one implementation, each data sector includes a plurality of synchronization marks inserted between a given preamble and corresponding post-amble of the data sector.

A determination is then made as to whether another data sector is to be encoded (decision block 412). If so (yes from decision block 412), an initial synchronization mark is inserted for the data sector (block 404) and the procedure 400 continues as previously described. If not, (no from decision block 412), the procedure 400 continues to block 402 for additional data, when received. Thus, in this example, synchronization marks are used to define a block size for data included in a data sector 106. Thus, data corruption such as bit additions or omissions may be readily identified, further discussion of which may be found in relation to the following figure.

Figure 5:
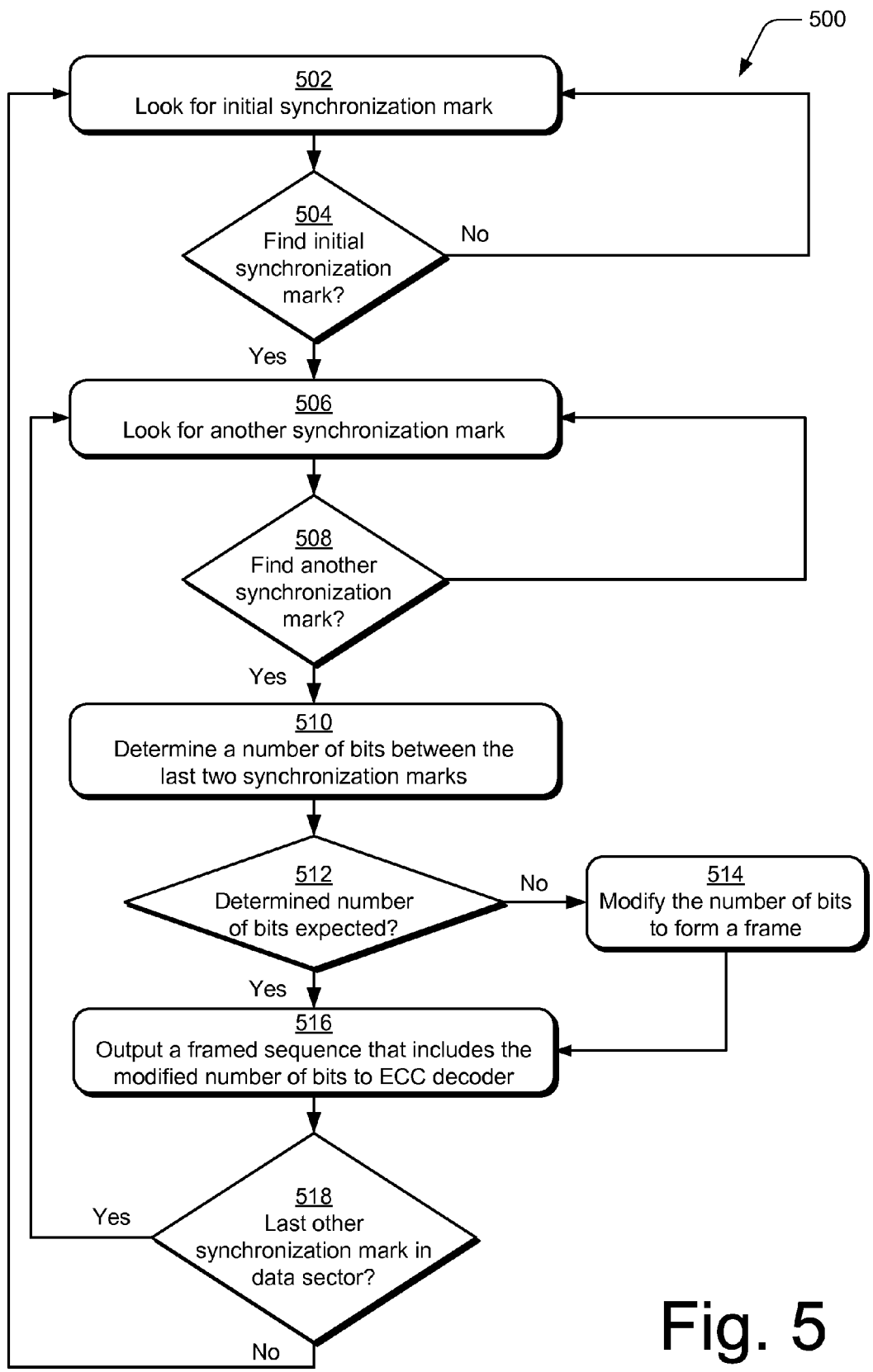
FIG. 5 is a flow diagram that depicts a procedure in an example implementation in which a data sector having a synchronization mark disposed between data blocks is read.

FIG. 5 depicts a procedure 500 in an example implementation in which data is read by the media drive 102 according to a bit patterned magnetic media data format. The following discussion may be implemented utilizing the previously described systems and devices, as well as other systems and devices subsequently described. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

In this example procedure 500, a request a received to read data from the bit patterned magnetic media 104 of the media drive 102. This request may originate from a variety of sources, such as an application that is executing on a host that is communicatively coupled to the media drive 102, over a wireless network, and so on. In response, the media reader module 102 locates a data sector 106 that contains the data by finding a preamble 210 of the data sector 106.

When the data sector 106 is located, the media reader module 110 looks for an initial synchronization mark 212 (block 502) of the data sector 106. In this way, the media reader module may determine where the data is located in the data sector 106.

When the initial synchronization mark 212 is found (yes from decision block 504), the media reader module 110 (and more particularly the mark detection module 306) looks for another synchronization mark 116 (block 506). When the other synchronization mark is found (yes from decision block 508), a number of bits is determined that is located between the last two synchronization marks (block 510). For example, the synchronization module 114 of the media reader module 110 may determine the number of bits located in the first data block 118.

A determination is then made as to whether the determined number of bits is expected (decision block 512). As previously described in relation to FIG. 4, the mark insertion module 208 may be implemented to insert the synchronization mark 116 at regular intervals in data in the data sector. In this way, the synchronization module 112 of the media writer module 108 may define a number of bits that are to be expected in each of the data blocks (e.g., the first and second data blocks 118, 120). Deviations from the expected number of marks may therefore be indicative of read and/or write errors.

When the determined number of bits is not expected (no from decision block 512), the number of bits is modified to form a frame (block 514) having the expected number of bits. For example, bits may be added by the synchronization module 114 when the number of bits in the first data block 118 is less than expected. In another example, bits may be deleted by the synchronization module 114 when the number of bits in the first data block 118 is more than expected. In this way, a framed sequence may be output that includes the modified number of bits to the error correction code decoder 308 (block 516).

The error correction code decoder 308 may then use one or more error correction techniques to recover data. For example, an indication may be communicated to the error correction code decoder 308 from the synchronization module 114 that indicates that the number of bits was not expected. Therefore, the error correction code decoder 308 may apply one or more error correction techniques for bit insertion or omission as previously described. This procedure may continue for another synchronization mark in the data sector 106 (yes from decision block 518 to block 506) or for another data sector by locating an initial synchronization mark (no from decision block 518 to block 502).

Device Examples

FIGS. 6-14 illustrate some examples of various devices that can implement various embodiments of the previously described techniques. For example, any of the various devices can be implemented as a device that employs the above described techniques, such as to store data in a bit patterned magnetic media data format previously described. The techniques may be employed within signal processing and/or control functionality of the devices, examples of which are as follows.

Figure 6:
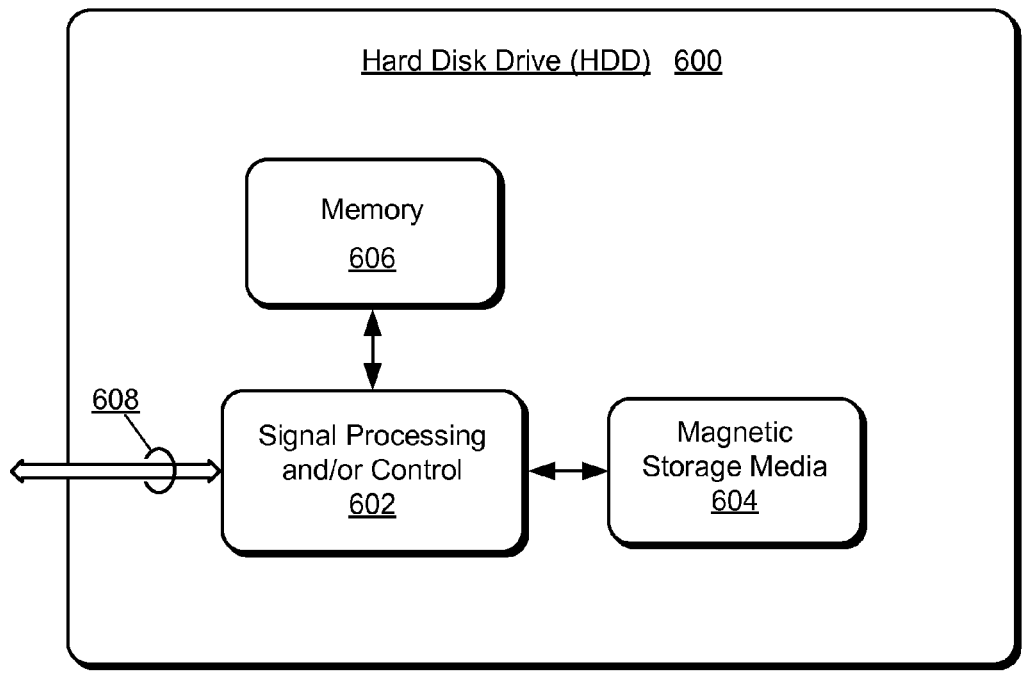
FIGS. 6-13 illustrate some examples of various devices that can employ bit patterned magnetic media data format techniques.

FIG. 6 illustrates an example device that may be embodied as a hard disk drive (HDD) 600, which includes signal processing and/or control circuit(s) generally identified at 602. The HDD 600 can also include a magnetic storage media 604 and/or a memory 606, such as random access memory (RAM), a low-latency nonvolatile memory such as flash memory, read only memory (ROM), and/or other suitable electronic data storage. In various implementations, the signal processing and/or control circuit(s) 602 can be implemented to process data (e.g., any of encoding, decoding, encryption, and/or decryption), perform data calculations, and/or format data. The data can be output to and/or received from at least the magnetic storage media 604 and/or the memory 606. In addition, the HDD 600 can communicate with a host device (not shown) such as a computer or mobile computing devices, such as a personal digital assistant, cellular phone, media or MP3 player, and/or other devices via one or more wired or wireless communication links 608.

Figure 7:
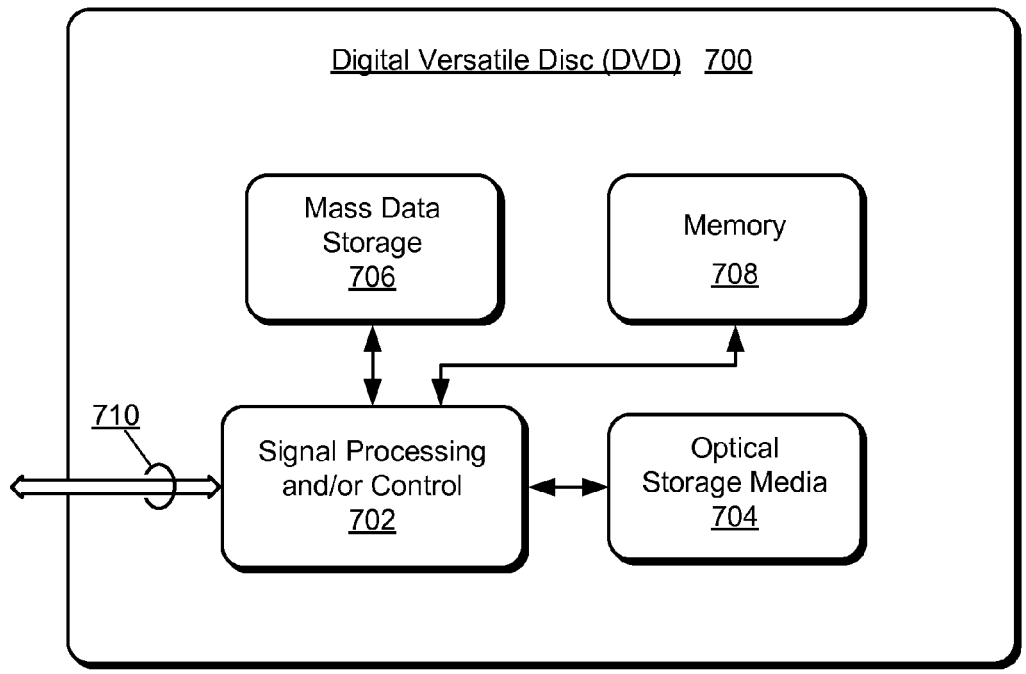

FIG. 7 illustrates an example device that may be embodied as a digital versatile disc (DVD) drive 700, which includes signal processing and/or control circuit(s) generally identified at 702. The DVD drive 700 can also include an optical storage media 704, mass data storage 706, and/or a memory 708, such as random access memory (RAM), a low-latency nonvolatile memory such as flash memory, read only memory (ROM), and/or other suitable electronic data storage. The mass data storage 706 can store data in a nonvolatile manner, and may include a hard disk drive (HDD) such as described with reference to FIG. 6, which may be a mini HDD that includes one or more platters having a diameter that is smaller than approximately 1.8 inches.

In various implementations, the signal processing and/or control circuit(s) 702 can be implemented to process data (e.g., any of encoding, decoding, encryption, and/or decryption), perform data calculations, format data, and/or any other signal processing functions associated with a DVD drive. The data can be written to and/or read from at least the optical storage media 704 and/or the memory 708. In addition, the DVD drive 700 can communicate with an output device (not shown) such as a computer, television, and/or other devices via one or more wired or wireless communication links 710.

Figure 8:
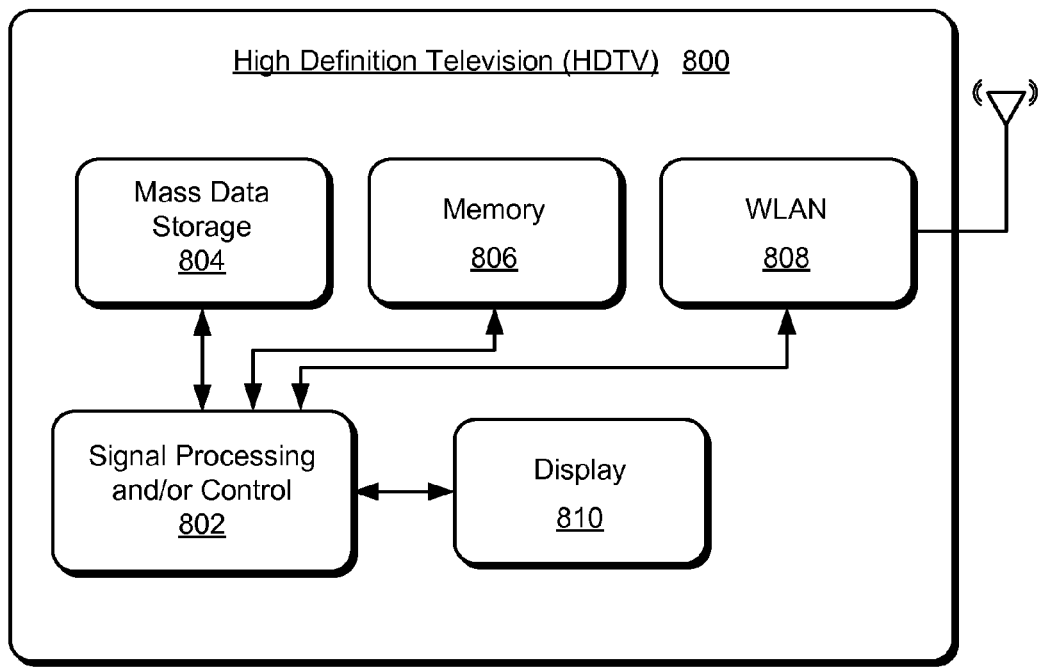

FIG. 8 illustrates an example device that may be embodied as a high definition television (HDTV) 800, which includes signal processing and/or control circuit(s) generally identified at 802. The HDTV 800 can also include mass data storage 804 and/or a memory 806, such as random access memory (RAM), a low-latency nonvolatile memory such as flash memory, read only memory (ROM), and/or other suitable electronic data storage. The mass data storage 804 can store data in a nonvolatile manner, and may include an optical storage media as described with reference to FIG. 7, and/or a drive as described with reference to FIG. 6, which may be a mini HDD that includes one or more platters having a diameter that is smaller than approximately 1.8 inches. In various implementations, the signal processing and/or control circuit(s) 802 can be implemented to process data (e.g., any of encoding, decoding, encryption, and/or decryption), perform data calculations, format data, and/or any other signal processing functions associated with an HDTV. The data can be output to and/or received from at least the memory 806. In addition, the HDTV 800 includes a wireless local area network (WLAN) interface 808 via which input signals can be received in either a wired or wireless format. HDTV output signals can be generated for a display 810.

Figure 9:
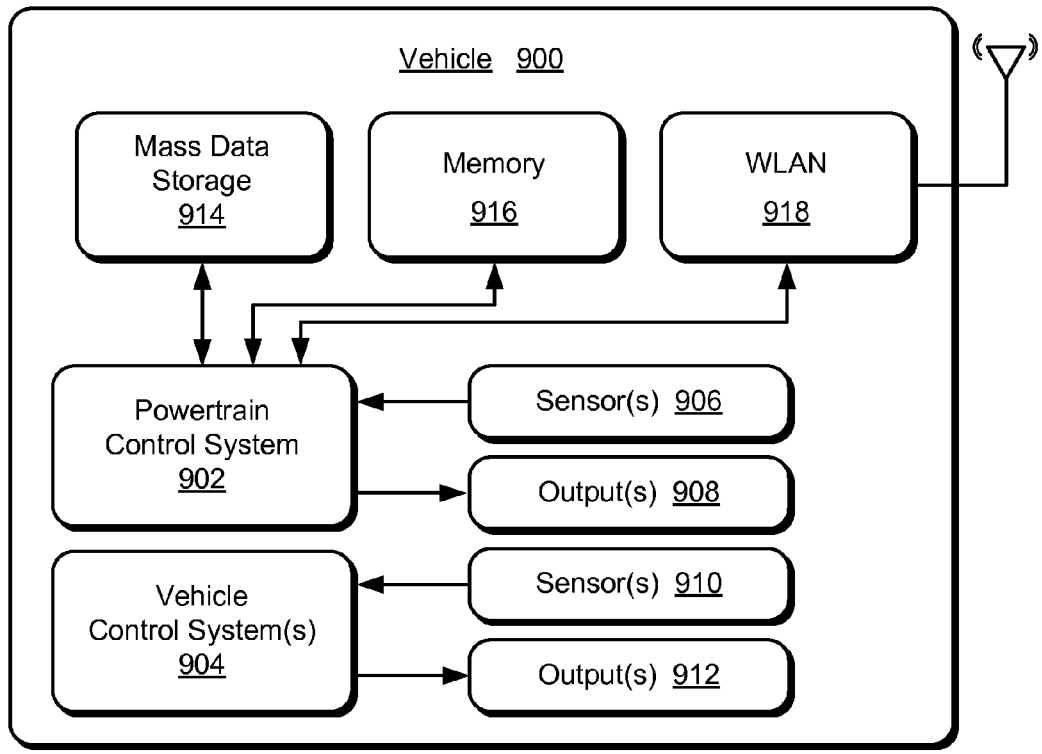

FIG. 9 illustrates an example device that may be embodied as a vehicle 900, which includes a powertrain control system 902 and, optionally, additional vehicle control system(s) 904. The powertrain control system 902 can receive data inputs from one or more sensors 906 such as temperature sensors, pressure sensors, rotational sensors, airflow sensors, and/or any other suitable sensors. The powertrain control system 902 can receive the data inputs and generate one or more output control signals 908, such as engine operating parameters, transmission operating parameters, braking parameters, and/or other control signals.

Additional control system(s) 904 may likewise receive data signals from one or more input sensors 910 and/or generate output control signals 912 to one or more output devices. In various implementations, a control system 904 may be part of an anti-lock braking system (ABS), a navigation system, a telematics system, a vehicle telematics system, a lane departure system, an adaptive cruise control system, and/or a vehicle entertainment system such as a stereo, DVD, compact disc, and the like.

The vehicle 900 can also include mass data storage 914 and/or a memory 916, such as random access memory (RAM), a low-latency nonvolatile memory such as flash memory, read only memory (ROM), and/or other suitable electronic data storage. The mass data storage 914 can store data in a nonvolatile manner, and may include an optical storage media as described with reference to FIG. 7, and/or a drive as described with reference to FIG. 6, which may be a mini HDD that includes one or more platters having a diameter that is smaller than approximately 1.8 inches. In addition, vehicle 900 includes a wireless local area network (WLAN) interface 918 via which input signals can be received in either a wired or wireless format. The powertrain control system 902 also may support connections with a WLAN via the WLAN interface 918.

Figure 10:
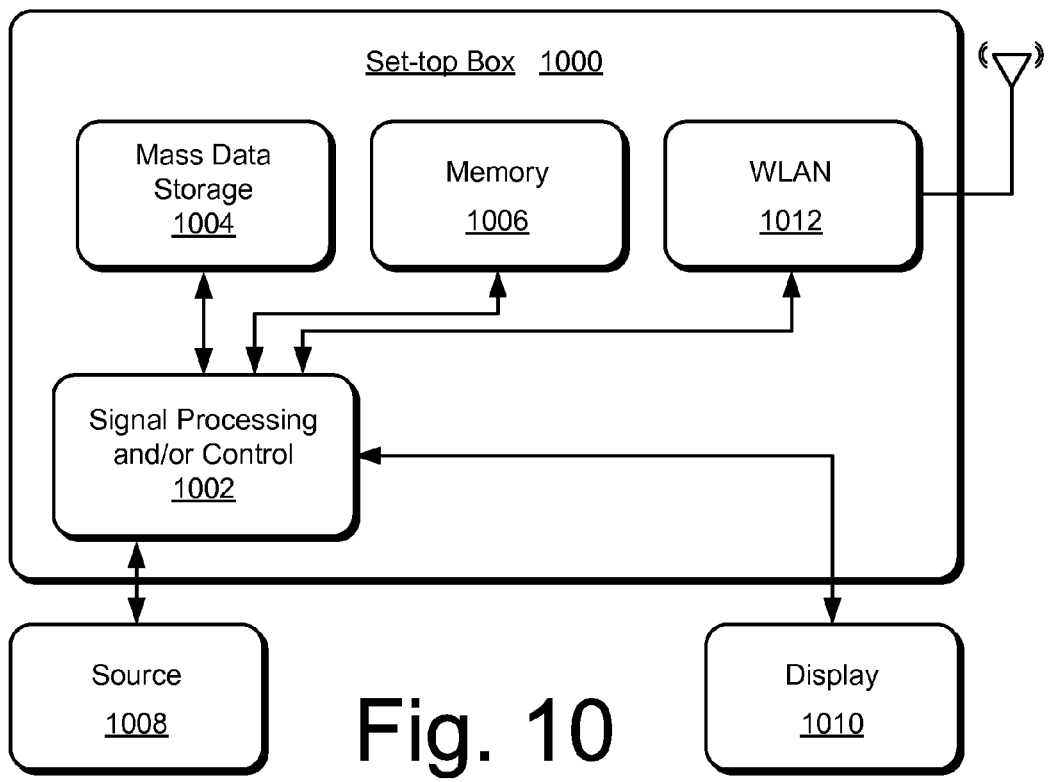

FIG. 10 illustrates an example device that may be embodied as a television set-top box 1000, which includes signal processing and/or control circuit(s) generally identified at 1002. The set-top box 1000 can also include mass data storage 1004 and/or a memory 1006, such as random access memory (RAM), a low-latency nonvolatile memory such as flash memory, read only memory (ROM), and/or other suitable electronic data storage. The mass data storage 1004 can store data in a nonvolatile manner, and may include an optical storage media as described with reference to FIG. 7, and/or a drive as described with reference to FIG. 6, which may be a mini HDD that includes one or more platters having a diameter that is smaller than approximately 1.8 inches.

The set top box 1000 can receive data signals from a source 1008, such as a broadband source, and can then output standard and/or high definition audio/video signals suitable for a display 1010, such as a television, monitor, and/or other video and/or audio output devices. In various implementations, the signal processing and/or control circuit(s) 1002 can be implemented to process data (e.g., any of encoding, decoding, encryption, and/or decryption), perform data calculations, format data, and/or any other signal processing functions associated with a television set-top box. The data can be output to and/or received from at least the memory 1006 and/or the source 1008. In addition, the set-top box 1000 includes a wireless local area network (WLAN) interface 1012 via which input signals can be received in either a wired or wireless format. The set-top box 1000 may also support connections with a WLAN via the WLAN interface 1012.

Figure 11:
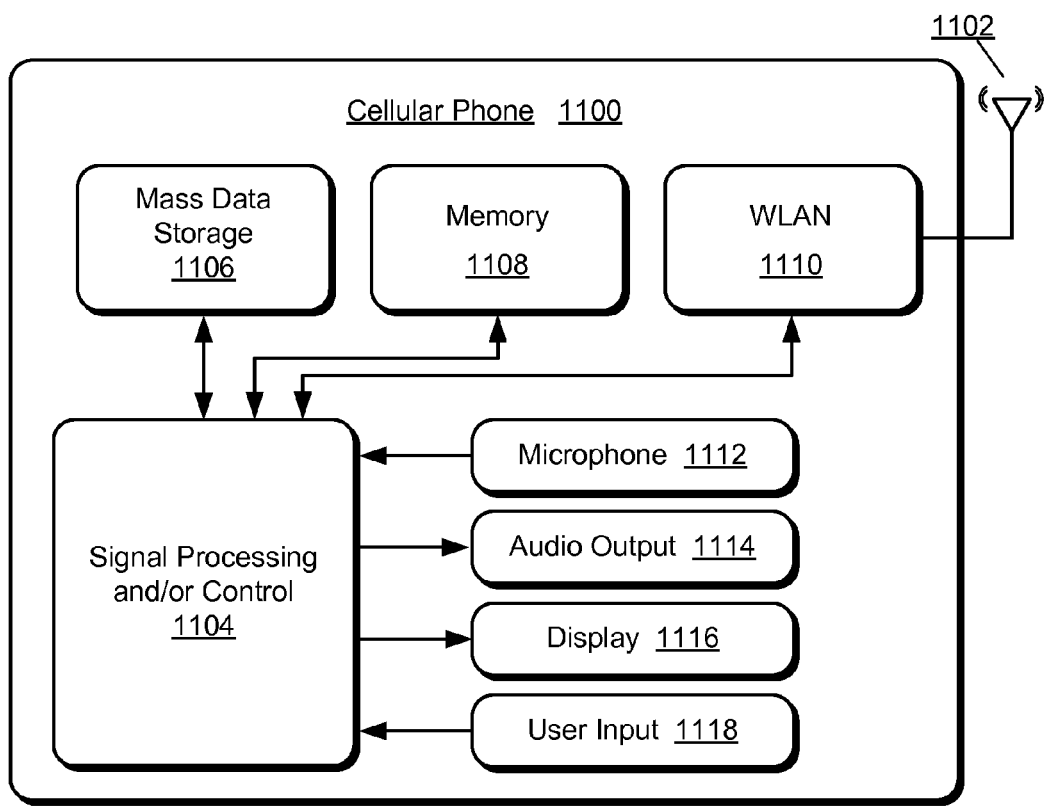

FIG. 11 illustrates an example device that may be embodied as a cellular phone 1100, which includes a cellular antenna 1102 and signal processing and/or control circuit(s) generally identified at 1104. The cellular phone 1100 can also include mass data storage 1106 and/or a memory 1108, such as random access memory (RAM), a low-latency nonvolatile memory such as flash memory, read only memory (ROM), and/or other suitable electronic data storage. The mass data storage 1106 can store data in a nonvolatile manner, and may include an optical storage media as described with reference to FIG. 7, and/or a drive as described with reference to FIG. 6, which may be a mini HDD that includes one or more platters having a diameter that is smaller than approximately 1.8 inches.

In various implementations, the signal processing and/or control circuit(s) 1104 can be implemented to process data (e.g., any of encoding, decoding, encryption, and/or decryption), perform data calculations, format data, and/or any other signal processing functions associated with a cellular phone. The data can be output to and/or received from at least the memory 1108. In addition, the cellular phone 1100 includes a wireless local area network (WLAN) interface 1110 via which input signals can be received in a wireless format. The cellular phone 1100 may also support connections with a WLAN via the WLAN interface 1110. In some implementations, the cellular phone 1100 can include a microphone 1112, an audio output 1114 such as a speaker and/or audio output jack, a display 1116, and/or an input device 1118 such as a keypad, pointing device, voice actuation, and/or other input device.

Figure 12:
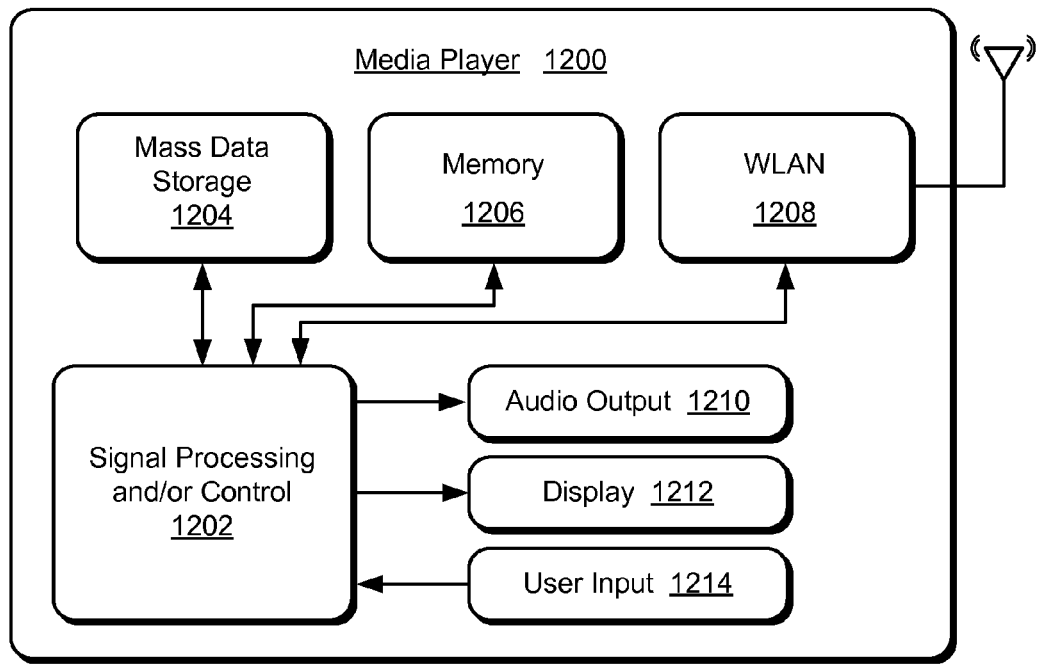

FIG. 12 illustrates an example device that may be embodied as a media player 1200, which includes signal processing and/or control circuit(s) generally identified at 1202. The media player 1200 can also include mass data storage 1204 and/or a memory 1206, such as random access memory (RAM), a low-latency nonvolatile memory such as flash memory, read only memory (ROM), and/or other suitable electronic data storage. The mass data storage 1204 can store data, such as compressed audio and/or video content, in a nonvolatile manner. In some implementations, compressed audio files include files that are compliant with an MP3 format or other suitable compressed audio and/or video formats. The mass data storage 1204 may include an optical storage media as described with reference to FIG. 7, and/or a drive as described with reference to FIG. 6, which may be a mini HDD that includes one or more platters having a diameter that is smaller than approximately 1.8 inches.

In various implementations, the signal processing and/or control circuit(s) 1202 can be implemented to process data (e.g., any of encoding, decoding, encryption, and/or decryption), perform data calculations, format data, and/or any other signal processing functions associated with a media player. The data can be output to and/or received from at least the memory 1206. In addition, the media player 1200 includes a wireless local area network (WLAN) interface 1208 via which input signals can be received in either a wired or wireless format. The media player 1200 may also support connections with a WLAN via the WLAN interface 1208. In some implementations, the media player 1200 can include an audio output 1210 such as a speaker and/or audio output jack, a display 1212, and/or an input device 1214 such as a keypad, touchpad, pointing device, voice actuation, and/or other input device. In various implementations, media player 1200 may employ a graphical user interface (GUI) that typically includes menus, drop down menus, icons, and/or a point-and-click interface via display 1212 and/or user input 1214.

Figure 13:
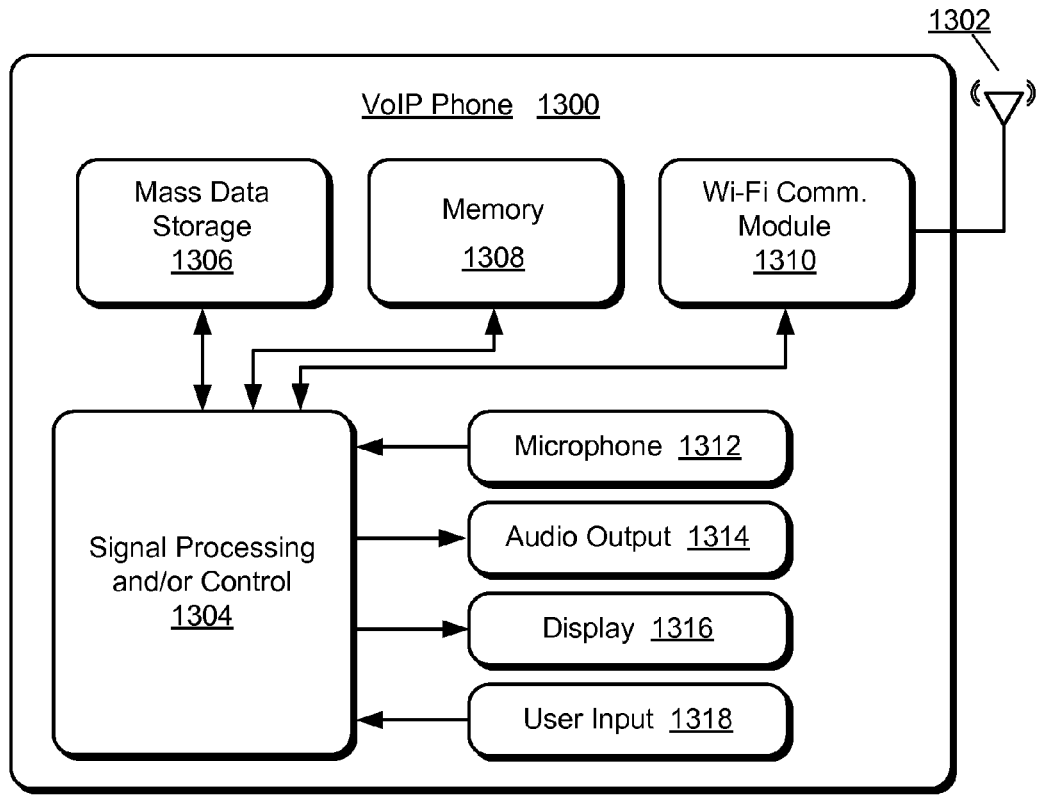

FIG. 13 illustrates an example device that may be embodied as a Voice over Internet Protocol (VoIP) phone 1300, which includes an antenna 1302 and/or is implemented in connection with a VoIP box that enables a conventional telephone to be plugged in and utilized with VoIP technology. The VoIP phone 1300 also includes signal processing and/or control circuit(s) generally identified at 1304. The VoIP phone 1300 can also include mass data storage 1306 and/or a memory 1308, such as random access memory (RAM), a low-latency nonvolatile memory such as flash memory, read only memory (ROM), and/or other suitable electronic data storage. The mass data storage 1306 can store data in a nonvolatile manner, and may include an optical storage media as described with reference to FIG. 7, and/or a drive as described with reference to FIG. 6, which may be a mini HDD that includes one or more platters having a diameter that is smaller than approximately 1.8 inches.

In various implementations, the signal processing and/or control circuit(s) 1304 can be implemented to process data (e.g., any of encoding, decoding, encryption, and/or decryption), perform data calculations, format data, and/or any other signal processing functions associated with a VoIP phone. The data can be output to and/or received from at least the memory 1308. In addition, the VoIP phone 1300 includes a Wireless Fidelity (Wi-Fi) communication module 1310 via which communication links with a VoIP network can be established. In some implementations, the VoIP phone 1300 can include a microphone 1312, an audio output 1314 such as a speaker and/or audio output jack, a display 1316, and/or an input device 1318 such as a keypad, pointing device, voice actuation, and/or other input device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
reading a data sector from bit patterned magnetic media by:
reading a data block disposed between two synchronization marks included in the data sector, the two synchronization marks bounding a number of bits in the data block and configured such that a bit insertion or a bit omission in an adjacent data block of the sector does not affect the number of bits in the data block;
when the number of bits in the data block bound by the synchronization marks is different from a number of bits that are expected to be included in the data block, modifying the number of bits to form a frame having the number of bits that are expected; and
outputting the frame.

2. The method as described in claim 1, wherein the outputting is performed to an error correction code decoder.

3. The method as described in claim 1, wherein the modifying is performed to add bits to the data block when the number of bits in the data block is less than the number of bits that are expected.

4. The method as described in claim 1, wherein the modifying is performed to delete bits from the data block when the number of bits in the data block is more than the number of bits that are expected.

5. The method as described in claim 1, wherein a length of a first of the two synchronization marks is different from a length of a second of the two synchronization marks.

6. The method as described in claim 5, wherein the first of the two synchronization marks is an initial synchronization mark indicating a start of the data sector.

7. The method as described in claim 6, wherein the initial synchronization mark is located adjacent to a preamble of the data sector.

8. A media drive controller comprising:
a first interface configured to read data stored by bit patterned magnetic media;
a second interface configured to enable a host computing device to access the data; and
a synchronization module configured to:
determine a number of bits of a data block read from the bit patterned magnetic media via the first interface, the data block bound by two synchronization marks included in a data sector of the bit patterned magnetic media, the two synchronization marks bounding the number of bits of the data block and configured such that a bit insertion or a bit omission in an adjacent data block of the sector does not affect the number of bits of the data block; and
modify the number of bits of the data block to form a data frame for output via the second interface when the number of bits in the data block bound by the two synchronization marks is different from a number of bits that are expected to be included in the data block.

9. The media drive controller as described in claim 8, wherein the media drive controller further comprises an error correction code decoder to output the frame via the second interface.

10. The media drive controller as described in claim 8, wherein the act of modifying the number of bits comprises adding bits to the data block when the number of bits in the data block is less than the number of bits that are expected.

11. The media drive controller as described in claim 8, wherein the act of modifying the number of bits comprises deleting bits from the data block when the number of bits in the data block is more than the number of bits that are expected.

12. The media drive controller as described in claim 8, wherein a length of a first of the two synchronization marks is different from a length of a second of the two synchronization marks.

13. The media drive controller as described in claim 12, wherein the first of the two synchronization marks is an initial synchronization mark indicating a start of the data sector.

14. The media drive controller as described in claim 13, wherein the initial synchronization mark is located adjacent to a preamble of the data sector.

15. One or more computer-readable memory devices storing program code that, when executed by a processor, implements a synchronization module configured to:
  determine a number of bits of a data block read from a data sector of bit patterned magnetic media, the data block bound by two synchronization marks included in the data sector of the bit patterned magnetic media, the two synchronization marks bounding the number of bits of the data block and configured such that a bit insertion or a bit omission in an adjacent data block of the sector does not affect the number of bits of the data block; and
  modify the number of bits of the data block to form a data frame for output when the number of bits in the data block bound by the two synchronization marks is different from a number of bits that are expected to be included in the data block.

16. The one or more computer-readable memory devices as described in claim 15, wherein the data frame is output to an error correction code decoder configured to decode, and enable a host computing device to access, the data frame.

17. The one or more computer-readable memory devices as described in claim 15, wherein the act of modifying the number of bits comprises adding bits to the data block when the number of bits in the data block is less than the number of bits that are expected.

18. The one or more computer-readable memory devices as described in claim 15, wherein the act of modifying the number of bits comprises deleting bits from the data block when the number of bits in the data block is more than the number of bits that are expected.

19. The one or more computer-readable memory devices as described in claim 15, wherein a length of a first of the two synchronization marks is different from a length of a second of the two synchronization marks.

20. The one or more computer-readable memory devices as described in claim 19, wherein the first of the two synchronization marks is an initial synchronization mark indicating a start of the data sector.

* * * * *